(No Model.)

W. S. PHELPS.
STEAM PISTON VALVE.

No. 262,471. Patented Aug. 8, 1882.

WITNESSES:

INVENTOR:
W. S. Phelps
BY
ATTORNEYS.

UNITED STATES PATENT OFFICE.

WALTER S. PHELPS, OF WORTENDYKE, NEW JERSEY.

STEAM PISTON-VALVE.

SPECIFICATION forming part of Letters Patent No. 262,471, dated August 8, 1882.

Application filed March 23, 1882. (No model.)

*To all whom it may concern:*

Be it known that I, WALTER S. PHELPS, of Wortendyke, in the county of Bergen and State of New Jersey, have invented a new and useful Improvement in Steam Piston-Valves, of which the following is a full, clear, and exact description.

My invention consists in a piston-valve of novel construction, combined with a cylinder and inclosing case or shell, as hereinafter described and claimed, the object being to furnish a balanced valve reliable in action and of durable construction.

Reference is to be had to the accompanying drawings, forming a part of this specification, in which similar letters of reference indicate corresponding parts in all the figures.

Figure 1:
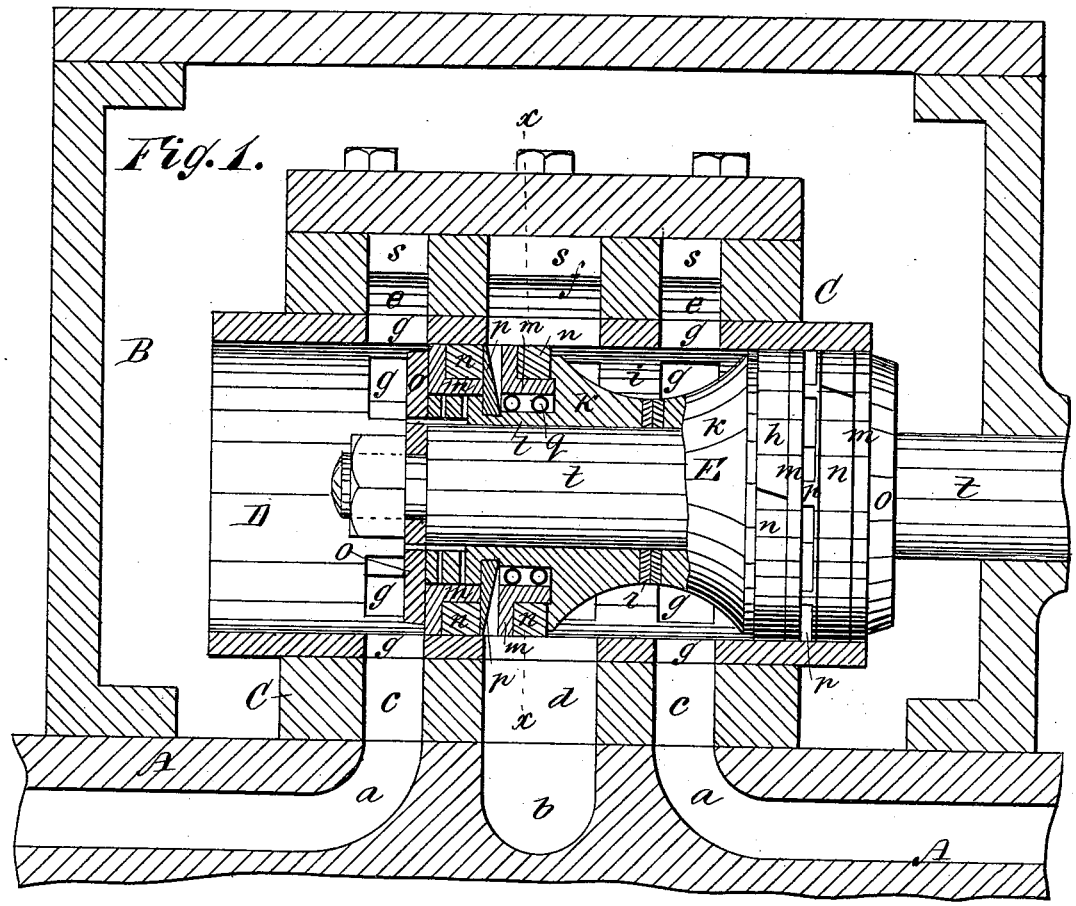
Figure 2:
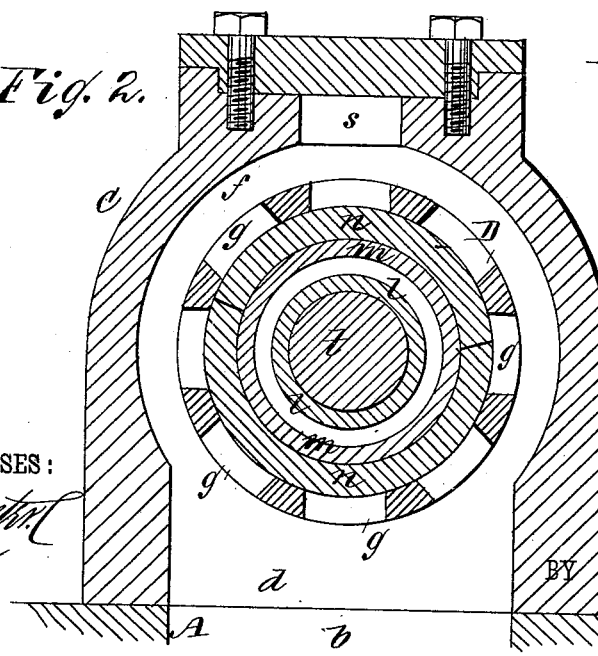
Figure 3:
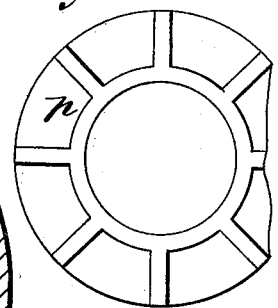

Figure 1 is a longitudinal section of a steam-chest fitted with the improved valve, and Fig. 2 is a transverse section on line $x$ $x$. Fig. 3 is a detail view.

A represents the side of an engine-cylinder, formed with steam-ports $a$ $a$ and exhaust-port $b$.

B is the steam-chest.

C is the valve case or shell, secured upon cylinder A over the ports $a$ $b$, and formed with slots $c$ $c$ and $d$ in the under side, registering with the ports of the cylinder. The shell C is formed with a circular aperture extending from end to end, and internally the shell is formed with annular transverse grooves $e$ $e$ $f$, that connect with the slots $c$ $c$ and $d$.

D is a hollow cylinder, of a size to fit snugly in the longitudinal aperture of the shell, wherein the cylinder is firmly secured, and of a length to project at the ends of the shell. This cylinder D is provided with apertures $g$, of suitable shape, opening into the grooves $e f$ of the shell, and placed as closely together as may be, sufficient space being left between the opening for support of the piston-valve E, which works in the cylinder.

The piston or valve E is upon the end of a rod or stem, $t$, and in its general construction consists of heads $h$ $h$, separated by an annular groove or exhaust-steamway, $i$. The heads $h$ are packed to fit the cylinder steam-tight, so as to prevent leakage of steam into the exhaust-space $i$, and the reciprocation of the valve connects the openings $g$ $c$ and ports $a$ with the opening $g$ $d$ and port $b$, first at one end and then at the other.

In detail the heads are made up of beveled collars $k$ on the rod, formed with sleeves $l$, that receive split compression-rings $m$ and packing-rings $n$, which are held between collars $k$ and washers $o$, a nut at the outer end of rod $t$ retaining the parts securely. There are two compression-rings $m$ and packing-rings $n$ in each head, separated by a follower-ring, $p$, which is grooved radially on the sides toward the collar $k$. Between the inner ring $m$ and sleeve $l$ is a space connecting with the grooves in ring $p$, so as admit steam behind the compression-ring, and the space contains a coiled spring, $q$, for retaining the parts concentric. The outer ring $m$ receives steam behind it directly through holes in washer $o$ and in the sleeve $l$. The rings $m$ serve to prevent leakage while the piston is passing the ports. The follower $p$ cuts off the live steam from passing behind the inner compression-ring $m$, so that while the outer ring is expanded by steam under boiler-pressure the inner ring receives behind it the steam or hot gases at their pressure in the cylinder. The effect is to relieve the pressure in the cylinder to a certain extent before the exhaust opens, and thus relieve the valve of the excessive upward pressure at the exhaust end, which, in ordinary slide-valves, often lifts them from their seat. The space may be enlarged to any extent required for relief of the pressure. The two collars $k$ $k$ are separated by washers $r$, that give the proper length to the valve and width to groove $i$. The shell C is made with openings $s$ in its upper side, extending into the grooves $e f$, through which the position of the valve can be noted in setting it. These openings are covered by a plate, as shown, when the valve is in use.

Having thus described my invention, I claim as new and desire to secure by Letters Patent—

1. The grooved follower-ring $p$, combined with the compressing-rings $m$ and packing-rings $n$ of the piston-valve, substantially as and for the purpose set forth.

2. A piston-valve provided with two compression-rings, $m$, and packing-rings $n$, separated by a follower, $p$, the outer rings $m$ being fitted to receive steam from the chest and the inner rings from the cylinder, substantially as shown and described.

WALTER S. PHELPS.

Witnesses:
GEO. D. WALKER,
C. SEDGWICK.